(12) United States Patent
Kline et al.

(10) Patent No.: US 10,899,364 B2
(45) Date of Patent: Jan. 26, 2021

(54) AUTONOMOUS VEHICLE SYSTEM

(71) Applicant: International Business Machines Corporation, Armonk, NY (US)

(72) Inventors: Eric V. Kline, Rochester, NY (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 16/025,686

(22) Filed: Jul. 2, 2018

(65) Prior Publication Data

US 2020/0001890 A1     Jan. 2, 2020

(51) Int. Cl.
*B60W 50/00* (2006.01)
*B60W 50/14* (2020.01)
*G01C 21/36* (2006.01)
*B60W 50/10* (2012.01)
*G06T 11/60* (2006.01)

(52) U.S. Cl.
CPC ............ *B60W 50/10* (2013.01); *B60W 50/00* (2013.01); *B60W 50/14* (2013.01); *G01C 21/3626* (2013.01); *G06T 11/60* (2013.01); *B60W 2050/0063* (2013.01); *B60W 2050/146* (2013.01); *B60W 2540/21* (2020.02)

(58) Field of Classification Search
CPC ...... B60W 50/10; B60W 50/00; B60W 50/14; B60W 2540/21; B60W 2050/146; B60W 2050/0063; G06T 11/60; G06T 11/00; G01C 21/3626; G02B 2027/0178; G08G 1/00

See application file for complete search history.

(56) References Cited

U.S. PATENT DOCUMENTS 7,920,071 B2 *  4/2011 Baillot ................ G05D 1/0027
                                                   340/937
9,507,346 B1 * 11/2016 Levinson ............. G05D 1/0291
9,612,123 B1   4/2017 Levinson et al.
(Continued)

FOREIGN PATENT DOCUMENTS

CA        2679371 C    10/2015
WO    2017079219 A1    5/2017

OTHER PUBLICATIONS

Anonymous, "Autonomous Intersection Management: Traffic Control for the Future", Youtube Video, Published Jun. 27, 2012, URL<https://www.youtube.comiwatch?v=4pbAI40dK0A>.
(Continued)

*Primary Examiner* — Thomas G Black
*Assistant Examiner* — Ana D Thomas
(74) *Attorney, Agent, or Firm* — Cantor Colburn LLP; Tihon Poltavets (57) ABSTRACT

An operator interface for controlling one or more autonomous vehicles. The operator interface is configured to generate a graphical rule creation interface (GRCI) for an operator. The GRCI is displayable to and interactive with the operator for allowing the operator to input instructions. The operator interface is further configured to compile a rule set for governing operations of the one or more autonomous vehicles from instructions inputted by the operator via the GRCI and to upload the rule set to memory units of each of the one more autonomous vehicles to supersede previously installed rule sets.

20 Claims, 3 Drawing Sheets

(56) References Cited

U.S. PATENT DOCUMENTS

2016/0282879 A1* 9/2016 Ichikawa ............ G01C 21/3658
2017/0297568 A1* 10/2017 Kentley ................ G09G 5/363
2017/0363430 A1 12/2017 Al-Dahle et al.

OTHER PUBLICATIONS

Anonymous, "Autonomous Vehicles | Self-Driving Vehicles Enacted Legislation", Online Retrieved 2018, URL<http://www.ncsl.org/research/transportation/autonomous-vehicles-self-driving-vehicles-enacted-legislation.aspx>, 13 pages.
Hawkins, "New rules of the road for self-driving cars have just been released", 2016, Online Retrieved, URL<https://www.theverge.com/2016/9/19/12981448/self-driving-car-guidelines-obama-foxx-dot-nhtsa>, 6 pages.

* cited by examiner

AUTONOMOUS VEHICLE SYSTEM

BACKGROUND

The present invention generally relates to autonomous vehicles and, more specifically, to an operator interface for controlling one or more autonomous vehicles, an autonomous vehicle system and a method for operating one or more autonomous vehicles.

Autonomous vehicles are increasingly present on modern roadways and are often configured as cars or trucks that can be operated in a driver operated mode or a driverless in which the autonomous vehicles are operated substantially autonomously and without human interaction but in which the autonomous vehicles can still be at least partially operated by human interactions. In either mode, each autonomous vehicle is operated or driven according to road and environmental conditions, traffic conditions and pre-installed or recently installed driving rule sets that govern how each of the autonomous vehicles are to be driven and especially when they operate in the driverless modes.

SUMMARY

Embodiments of the present invention are directed to an operator interface for controlling one or more autonomous vehicles. Non-limiting embodiments of the operator interface are configured to generate a graphical rule creation interface (GRCI) for an operator. The GRCI is displayable to and interactive with the operator for allowing the operator to input instructions. Non-limiting embodiments of the operator interface are further configured to compile a rule set for governing operations of the one or more autonomous vehicles from instructions inputted by the operator via the GRCI and to upload the rule set to memory units of each of the one more autonomous vehicles to supersede previously installed rule sets.

Embodiments of the present invention are directed to an autonomous vehicle system. Non-limiting embodiments of the autonomous vehicle system include one or more autonomous vehicles and an operator interface. The one or more autonomous vehicles respectively include memory units for storing first and second driving rule sets. The one or more autonomous vehicles are respectively operable for driving according to the first and second driving rule sets, the first driving rule set is installed in the memory units at an initial instance and the second driving rule set supersedes the first driving rule set in an event the second driving rule set is uploaded to the memory units. The operator interface is coupled to each of the one or more autonomous vehicles and is configured to generate a graphical rule creation interface (GRCI) for an operator, compile the second driving rule set from instructions inputted by the operator via the GRCI and upload the second driving rule set to the memory units at a secondary instance.

Embodiments of the invention are directed to a method of operating one or more autonomous vehicles. Non-limiting embodiments of the method include installing a first driving rule set in memory units of each of the one or more autonomous vehicles, operating the one or more autonomous vehicles according to the first driving rule set, generating a graphical rule creation interface (GRCI) for an operator, compiling a second driving rule set, according to which the one or more autonomous vehicles are operable, from instructions inputted by the operator via the GRCI, uploading the second driving rule set to the memory units to supersede the first rule set and operating the one or more autonomous vehicles according to the second driving rule set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, autonomous vehicles are currently capable of executing a wide range of driverless operations. In particular, autonomous vehicles can communicate with each other and make certain decisions regarding driving rules. These include automatically diverting around traffic jams and accidents as well as automatically selecting one route versus another. Future autonomous vehicles will be capable of executing an even greater range of driverless operations. In the meantime and for the near future, however, certain driving decisions need to be made by a human operator.

The need for a human operator presents a challenge, however, in that the need can arise quickly and there may not be a human operator readily available. Also, the need for the human operator may be present for multiple autonomous vehicles and, even if a human operator is available, he or she may only be able to operate a single autonomous vehicle at a time. In an exemplary case, a road traffic officer needs to be able to create traffic management rules relatively easily so that one or more autonomous vehicles can be controlled to follow the rule.

Turning now to an overview of the aspects of the invention, one or more embodiments of the invention address the above-described shortcomings of the prior art by providing for an autonomous vehicle system in which a graphical rule creation interface (GRCI) is displayed to an operator of one or more autonomous vehicles whereby the operator can interact with the GRCI to control various operations of the one or more autonomous vehicles.

An operator, such as a road traffic officer (RTO) can use the autonomous vehicle system to graphically create autonomous vehicle driving rules in or with an electronic map by drawing contours and/or writing text on the electronic map. The created autonomous vehicle driving rules can relate to the definition of traffic rules, like speed limits, restricted areas for vehicle movements, authorized vehicles, spacing between any pair vehicles, etc., and can be applied to each autonomous vehicle travelling through a given area. In some cases, the RTO will be able to use a stylus, gestures and verbal commands to draw and write traffic rules in an electronic map. While creating this type of traffic rule, the RTO can select time-based rules, event-based rules, etc. For time-based rules, dates and time ranges can be defined while the rules are created. An event-based rule can be created by defining a workflow. The RTO can also use augmented reality glasses to apply traffic rules within his or her own field of view. As such, the RTO can apply pin-pointed traffic control on any one or more autonomous, semi-autonomous or driver operated vehicles. In addition, the RTO will be able to visualize a predicted impact of a potential traffic rule.

Figure 1:
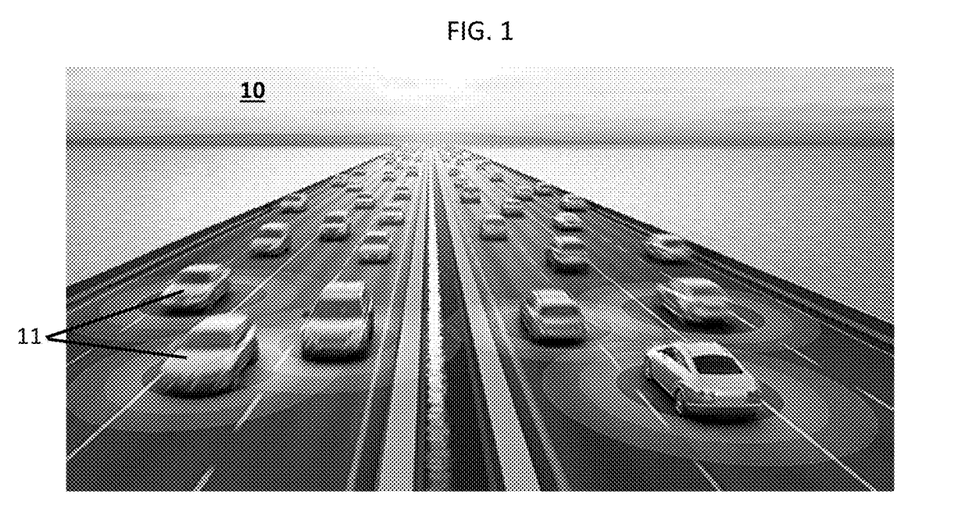
FIG. 1 is a perspective view of autonomous vehicles in accordance with embodiments of the present invention.

Turning now to a more detailed description of aspects of the present invention, FIG. 1, an autonomous vehicle system 10 is provided. The autonomous vehicle system 10 includes one or more autonomous vehicles 11. The one or more autonomous vehicles 11 can be provided or configured as cars or automobiles or trucks, for example, which can be operated on roads with other driver-operated vehicles, semi-autonomous vehicles and autonomous vehicles.

Figure 2:
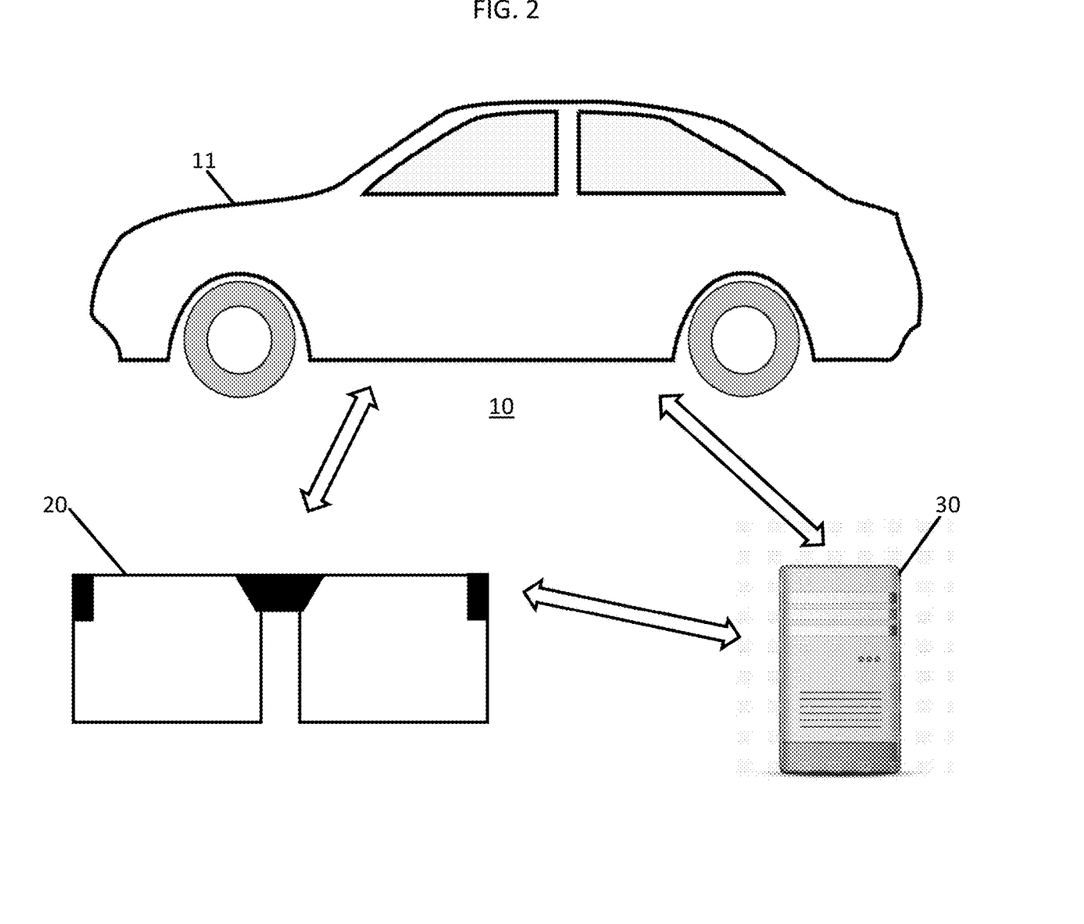
FIG. 2 is a schematic diagram illustrating a system of the autonomous vehicles of FIG. 1, an operator interface and a remote server in accordance with embodiments of the present invention.

With reference to FIG. 2, the autonomous vehicle system 10 can further include an operator interface 20 and a remote server 30. The operator interface 20 is capable of communicating with each of the autonomous vehicles 11 and the remote server 30. Each of the autonomous vehicles 11 is directly communicative with the other autonomous vehicles 11 or indirectly communicative with the other autonomous vehicles 11 by way of one or both of the operator interface 20 and the remote server 30.

Figure 3:
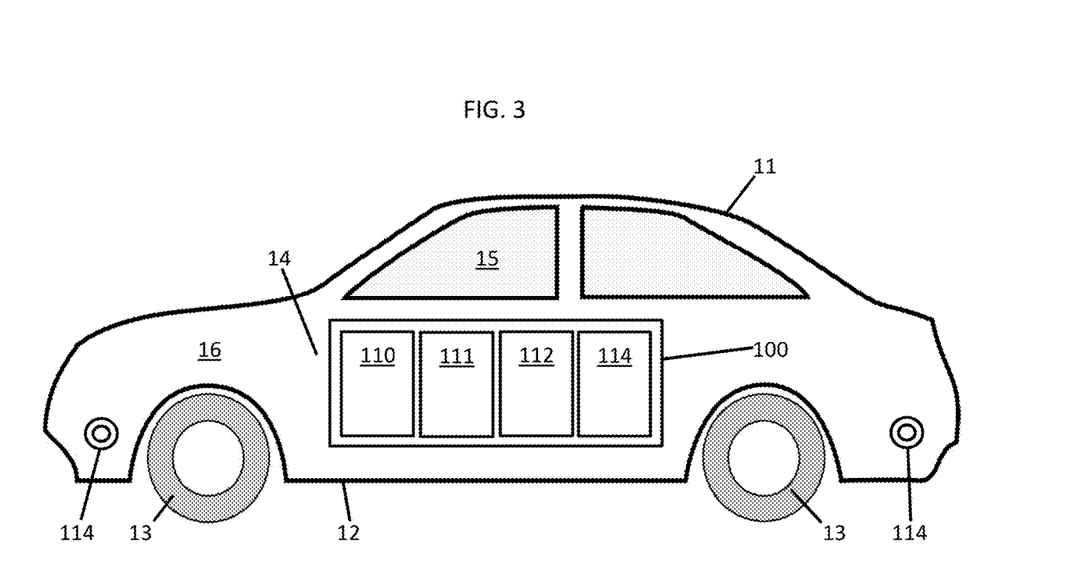
FIG. 3 is a schematic diagram of a control element of each of the autonomous vehicles of FIGS. 1 and 2.

With reference to FIG. 3, each autonomous vehicle 11 can include a chassis 12, wheels 13 coupled to the chassis 12, a body 14 that is disposed on the chassis 12 to accommodate an operator who may or may not be required for vehicle operations and, in some cases, one or more passengers along with steering and environmental control elements in a cabin 15 and to accommodate an engine in an engine compartment 16. Each autonomous vehicle 11 further includes a control element 100. The control element 100 includes a processing unit 110, memory units 111 for storing first and second driving rule sets, an input/output (I/O) unit 112 and a servo control unit 113.

Among other functions, the I/O unit 112 controls the flow of data between the processing unit 110 and sensors 114 that monitor current road and environmental conditions. The servo control unit 113 executes autonomous vehicle operation controls based on instructions and commands issued by the processing unit 110. In an exemplary case, the sensors 114 can sense a speed of the autonomous vehicle 11 as well as road conditions and supply sensing results to the processing unit 110 via the I/O unit 112. The processing unit 110 can then issue acceleration and steering instructions to the servo control unit 113 based on those sensing results whereupon the servo control unit 113 controls the steering of the wheels 13 and an output of the engine.

The memory units 111 have the first and second driving rule sets stored thereon along with executable instructions that are readable and executable by the processing unit 110. When the executable instructions are read and executed by the processing unit 110, the executable instructions cause the processing unit 110 to autonomously control various operations of the autonomous vehicle 11 based on the sensing results provided by the sensors 114 in an autonomous control mode or to control the various operations based on the sensing results provided by the sensors 114 and based on operator commands in a non- or semi-autonomous control mode.

In the autonomous control mode or in the semi-autonomous control modes, the processing unit 110 executes the autonomous control such that the autonomous vehicle 11 is operable for driving in accordance with multiple driving rules and regulations including, but not limited to the first driving rule set and the second driving rule set when the second driving rule set is installed or uploaded. The first and second driving rule sets can relate to various factors, such as road and traffic conditions, location and destination, speed limits and passenger schedules. The first driving rule set is installed or uploaded to the memory units 111 at an initial instance with the second driving rule set uploaded at a later time. To an extent that the first and second driving rule sets overlap, a later installed or uploaded rule with supersede an earlier installed or uploaded rule.

The operator interface 20 is coupled to each of the one or more autonomous vehicles 11 and configured to generate a graphical rule creation interface (GRCI) 201 for display to an operator, for viewing by the operator and for interaction with the operator such that the operator can input instructions via the GRCI 201. The operator interface 20 is further configured to receive instructions inputted by the operator via the GRCI 201, to compile the second driving rule set from those received instructions and to upload the second driving rule set to the memory units 111 of each of the autonomous vehicles 11 at a secondary instance.

In accordance with embodiments of the present invention, the operator interface 20 can be provided or configured as a computing device, a portable computing device or, in some cases, wearable augmented reality glasses 210. The following description will thus relate to the case of the operator interface 20 being provided or configured as the wearable augmented reality glasses 210 for purposes of clarity and brevity.

Figure 4:
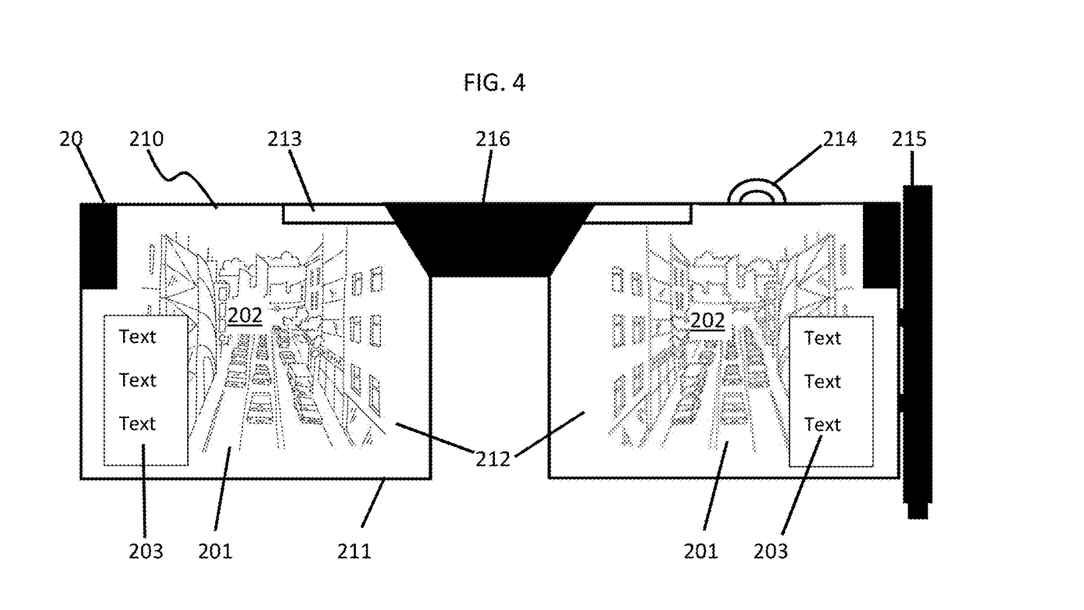
FIG. 4 is a perspective view of an operator observing a scene in accordance with embodiments of the present invention.

With reference to FIG. 4, the wearable augmented reality glasses 210 include a frame 211, a transparent or semi-transparent viewing window 212, a display element 213 for displaying at least the GRCI 201 on the viewing window 212, sensors 214, a stylus 215 and a control element 216 that is configured to control operations of the display element 213 in accordance with sensing results of the sensors 214 and a use of the stylus 215 and to communicate with the autonomous vehicles 11. The control element 216 includes a display processing unit, memory units, an input/output (I/O) unit and a servo control and networking unit.

Among other functions, the I/O unit controls the flow of data between the display processing unit and the sensors. The sensors can include or be provided as optical sensors, infrared or ultraviolet (IR or UV) sensors or audio sensors that can sense optical signals, such as a scene the operator is looking at, and sensors that can sense movements of the stylus 215. The servo control and networking unit control communications between the display processing unit, the autonomous vehicles 11 and the remote server 30.

In an exemplary case, the sensors 214 can observe a scene in the operator's field of view in which one or more autonomous vehicles 11 are operating on a road as well as the movements of the stylus 215 and supply sensing results to the display processing unit via the I/O unit. The display processing unit can then cause the display element 213 to display the GRCI 201 as or along with an augmented reality map 202 to the operator, which includes the details of the scene as well as drawings or writings 203 associated with the movements of the stylus 215.

The memory units have executable instructions that are readable and executable by the display processing unit. When the executable instructions are read and executed by the display processing unit, the executable instructions cause the display processing unit to generate the graphical rule creation interface (GRCI) 201 for viewing and interaction with an operator, to receive the instructions inputted by the operator via the GRCI 201 and to compile the second driving rule set from those received instructions and to upload the second driving rule set to the memory units 111 of each of the autonomous vehicles 11 at the secondary instance.

The remote server 30 is configured in a similar manner as the wearable augmented reality glasses 210 and will not be described further except in terms of the following functionality, which relates to modeling and predictive capabilities.

Figure 5:
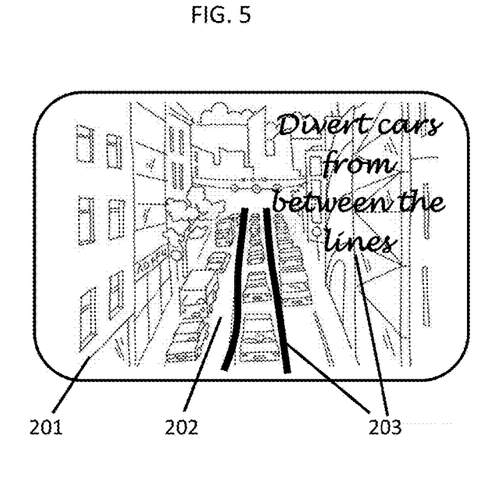
FIG. 5 is an illustration detailing an augmented reality of the scene observed by the operator of FIG. 4 along the operator's field of view in accordance with embodiments of the present invention.

With reference to FIG. 5, an operator who is wearing the wearable augmented reality glasses 210 (see FIG. 4) is looking in the direction of a scene in which one or more autonomous vehicles, to which the wearable augmented reality glasses 210 is connected, are operating on a road where an accident has taken place. While the autonomous vehicles are operating according to the first driving rule set installed in their respective memory units, it can be assumed that the first driving rule set is not capable of managing the autonomous vehicles in this instance. The operator thus has the responsibility of instructing the autonomous vehicles as to how to divert around the accident. This is done by the operator creating the second driving rule set by way of the GRCI 201 for subsequent uploading to the respective memory units of the autonomous vehicles.

In the exemplary case of FIG. 5, the operator can create the second driving rule set by using the stylus 215 (see FIG. 4) and/or hand gestures or vocal commands to draw or write driving rules into the augmented reality map 202 of the GRCI 201. Such driving rules can include contour drawings that effectively define lanes for the autonomous vehicles to move into so that they divert around the accident or traffic rules, such as speed limits, that insure that the autonomous vehicles move carefully along the lanes defined by the contours.

Figure 6:
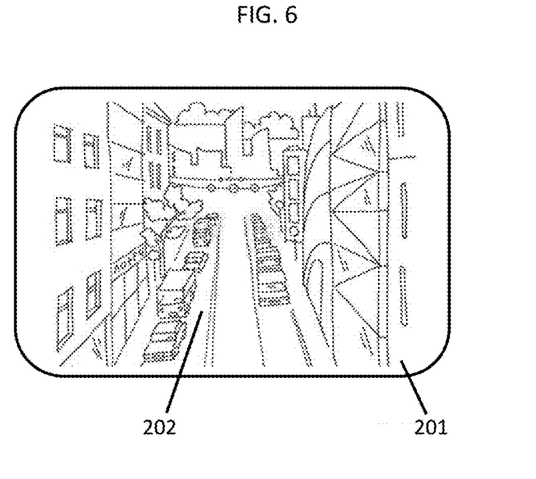
FIG. 6 is an illustration detailing an augmented reality of a prediction of the scene of FIG. 5 following a modeling of operator input instructions in accordance with embodiments of the present invention.

With reference to FIG. 6, at least one of the display processing unit and a similar component of the remote server 30 (see FIG. 2) can be configured to model an effect of the second driving rule set over a predefined period of time and to display the effect to the operator via the GRCI 201. That is, as shown in FIG. 6, in an event the second driving rule set is reflective of the inputs made by the operator by way of the GRCI 201 of FIG. 5, the at least one of the display processing unit and the similar component of the remote server 30 can model effects of the contours and the speed limits and can predict how these will affect traffic patterns over time. The at least one of the display processing unit and the similar component of the remote server 30 can then display a predicted future scene in the GRCI 201 (e.g., after 10 minutes, 1 hour and 4 hours) so that the operator can evaluate the usefulness of the second driving rule set and refine the same if necessary.

Once the drawings or writings 203 drawn and written into the augmented reality map 202 are completed and determined to be acceptable or appropriate by the operator, the GRCI 201 effectively receives the drawings or writings 203 as contour and traffic rule instructions that are analyzed by the display processing unit and then transmitted as the second driving rule set to the autonomous vehicles.

Figure 7:
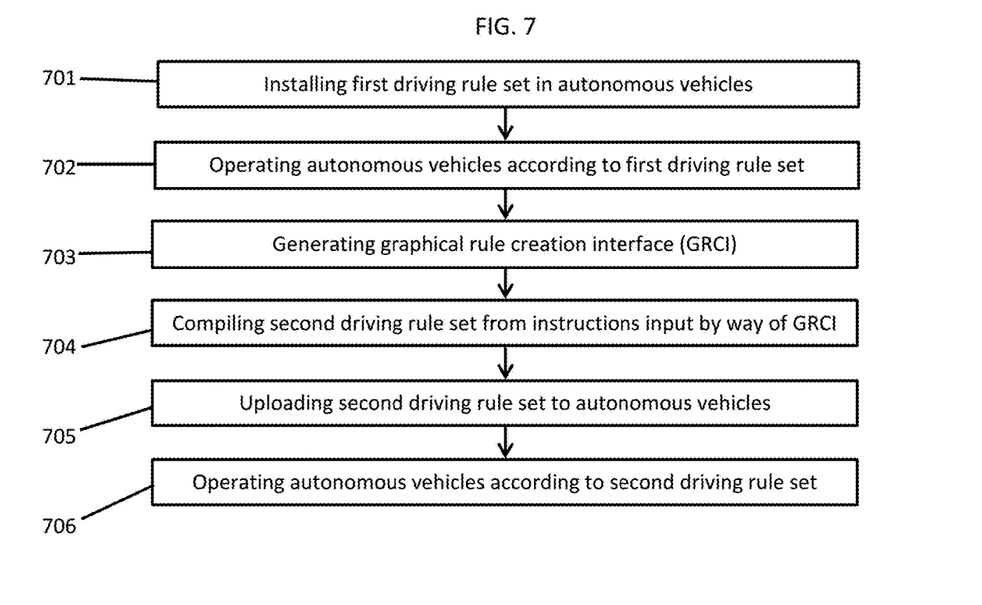
FIG. 7 is a flow diagram illustrating a method of operating one or more autonomous vehicles.

With reference to FIG. 7, a method of operating one or more autonomous vehicles is provided. The method includes installing a first driving rule set in memory units of each of the one or more autonomous vehicles (701) and operating the one or more autonomous vehicles according to the first driving rule set (702). The method further includes generating a graphical rule creation interface (GRCI) for an operator that can be displayed to the operator as an augmented reality map overlaid onto the operator's field of view through wearable augmented reality glasses (703) and compiling a second driving rule set, according to which the one or more autonomous vehicles are operable, from instructions inputted by the operator using a stylus, gestures or vocal commands via the GRCI (704). The method also includes uploading the second driving rule set to the memory units to supersede the first driving rule set in an event the second driving rule set is acceptable or approved (705). The method then includes operating the one or more autonomous vehicles according to the second driving rule set or some combination of the first and second driving rule sets in which the first and second driving rule sets do not overlap or contradict one another (706).

In an exemplary case, the operator or traffic officer will draw contours and/or write text in the augmented reality map displayed over his field of view through the augmented reality glasses (the text can but need not relate directly to the drawn contours) of, for example, a location of at least one of the one or more autonomous vehicles. A geographic coordinate boundary will then be identified from the drawn contours so that roads at or near the location that are relevant to the drawn contours can be identified in turn. In the meantime, the text will be analyzed to identify a type of rule that is being inputted by the operator for the location. Once the contours are complete and the rule understood, the contours and the rule will be transmitted to the autonomous vehicles as the second driving rule set that will govern their respective operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An operator interface for controlling one or more autonomous vehicles, the operator interface being configured to:
   generate a graphical rule creation interface (GRCI) for an operator, the GRCI being displayable to and interactive with the operator for allowing the operator to input instructions,
   compile a rule set for governing operations of the one or more autonomous vehicles from the instructions inputted by the operator via the GRCI,
   couple the GRCI with the one or more autonomous vehicles,
   upload the rule set to memory units of each of the one or more autonomous vehicles to provide an updated rule set that supersedes previously installed rule sets, and
   governing operations of the one or more autonomous vehicles according to the updated rule set.

2. The operator interface according to claim 1, wherein at least one of the operator interface and a remote server is configured to:
   model an effect of the rule set over a predefined period of time, and
   display the effect to the operator via the GRCI.

3. The operator interface according to claim 1, wherein the GRCI is displayable to the operator as an augmented reality map.

4. The operator interface according to claim 3, wherein the GRCI is receptive of and responsive to contour and traffic rule instructions drawn and written into the augmented reality map.

5. The operator interface according to claim 3, wherein the operator interface comprises a stylus for drawing and writing into the augmented reality map.

6. The operator interface according to claim 3, wherein the augmented reality map is receptive of and responsive to operator gestures and verbal commands.

7. The operator interface according to claim 3, wherein:
   the operator interface comprises augmented reality glasses for displaying the augmented reality map to the operator, and
   the augmented reality map is overlaid onto a field of view of the operator through the augmented reality glasses.

8. An autonomous vehicle system, comprising:
   one or more autonomous vehicles respectively comprising memory units for storing first and second driving rule sets,
   the one or more autonomous vehicles being respectively operable for driving according to the first and second driving rule sets, and
   the first driving rule set being installed in the memory units at an initial instance at an initial time and the second driving rule set superseding the first driving rule set in an event the second driving rule set is uploaded to the memory units; and
   an operator interface coupled to each of the one or more autonomous vehicles and configured to:
   generate a graphical rule creation interface (GRCI) for an operator,
   compile the second driving rule set from instructions inputted by the operator via the GRCI, and
   upload the second driving rule set to the memory units at a secondary instance at a secondary time following the initial time.

9. The autonomous vehicle system according to claim 8, further comprising a remote server by which the operator interface is coupled to each of the one or more autonomous vehicles,
   wherein each of the one or more autonomous vehicles is intercommunicative with the operator interface and at least one other autonomous vehicle directly or by way of the remote server.

10. The autonomous vehicle system according to claim 9, wherein at least one of the operator interface and the remote server is configured to:

model an effect of the second driving rule set over a predefined period of time, and
display the effect to the operator via the GRCI.

11. The autonomous vehicle system according to claim 8, wherein the GRCI is displayable to the operator as an augmented reality map.

12. The autonomous vehicle system according to claim 11, wherein the GRCI is receptive of and responsive to contour and traffic rule instructions drawn and written into the augmented reality map.

13. The autonomous vehicle system according to claim 11, wherein the operator interface comprises a stylus for drawing and writing into the augmented reality map.

14. The autonomous vehicle system according to claim 11, wherein the augmented reality map is receptive of and responsive to operator gestures and verbal commands.

15. The autonomous vehicle system according to claim 11, wherein:
the operator interface comprises augmented reality glasses for displaying the augmented reality map to the operator, and
the augmented reality map is overlaid onto a field of view of the operator through the augmented reality glasses.

16. A method of operating one or more autonomous vehicles, the method comprising:
installing a first driving rule set in memory units of each of the one or more autonomous vehicles;
operating the one or more autonomous vehicles according to the first driving rule set;
generating a graphical rule creation interface (GRCI) for an operator;
compiling a second driving rule set, according to which the one or more autonomous vehicles are operable, from instructions inputted by the operator via the GRCI;
uploading the second driving rule set to the memory units to supersede the first driving rule set; and
operating the one or more autonomous vehicles according to the second driving rule set.

17. The method according to claim 16, further comprising:
modeling an effect of the second driving rule set over a predefined period of time; and
displaying the effect to the operator via the GRCI.

18. The method according to claim 16, further comprising displaying the GRCI to the operator as an augmented reality map at a location of at least one of the one or more autonomous vehicles.

19. The method according to claim 18, wherein the method further comprises:
receiving and responding to contour and traffic rule instructions for the location, which are drawn and written into the augmented reality map; and
receiving and responding to operator gestures and verbal commands for the location.

20. The method according to claim 18, further comprising:
displaying the augmented reality map through augmented reality glasses; and
overlaying the augmented reality map onto a field of view of the location of the operator.

* * * * *